US012613868B2

(12) United States Patent
Zhang et al.

(10) Patent No.: US 12,613,868 B2
(45) Date of Patent: Apr. 28, 2026

(54) BIFURCATED SYSTEM FOR QUERYING MULTIPLE DATA TYPES

(71) Applicant: PayPal, Inc., San Jose, CA (US)

(72) Inventors: Pengshan Zhang, Shanghai (CN);
Yuliang Zhou, Shanghai (CN); Nitin S. Sharma, San Francisco, CA (US);
Eswaramoorthy Periyasamy, San Jose, CA (US); Xiaojun Luan, Shanghai (CN); Junshi Guo, Shanghai (CN)

(73) Assignee: PayPal, Inc., San Jose, CA (US)

( * ) Notice: Subject to any disclaimer, the term of this patent is extended or adjusted under 35 U.S.C. 154(b) by 0 days.

(21) Appl. No.: 18/617,163

(22) Filed: Mar. 26, 2024

(65) Prior Publication Data

US 2025/0278403 A1     Sep. 4, 2025

(30) Foreign Application Priority Data

Feb. 29, 2024     (WO) ................. PCT/CN2024/079228

(51) Int. Cl.
G06F 16/00          (2019.01)
G06F 16/23          (2019.01)
(Continued)

(52) U.S. Cl.
CPC ...... G06F 16/2455 (2019.01); G06F 16/2379 (2019.01); G06F 16/254 (2019.01); G06F 16/29 (2019.01)

(58) Field of Classification Search
CPC ............. G06F 16/2455; G06F 16/2379; G06F 16/254; G06F 16/29
See application file for complete search history.

(56) References Cited

U.S. PATENT DOCUMENTS 9,600,501 B1    3/2017  Fuller
10,496,768 B2   12/2019  Zhang et al.
(Continued)

FOREIGN PATENT DOCUMENTS

AU        2021470113 A1      1/2024
WO       2022272262 A1      12/2022
WO       2023015111 A1       2/2023

OTHER PUBLICATIONS

International Search Report and Written Opinion in PCT Appl. No. PCT/CN2024/079228 mailed Nov. 19, 2024, 8 pages.

*Primary Examiner* — Dinku W Gebresenbet
(74) *Attorney, Agent, or Firm* — Kowert, Hood, Munyon, Rankin & Goetzel, P.C.; Catherine L. Gerhardt; Dean M. Munyon

(57)          ABSTRACT

Techniques are disclosed relating to executing a bifurcated computer system for different types of data processing. The system receives a plurality of requests to execute queries and executes a first service of the system for a first query specified by the requests based on the first query specifying a first type of data. The system accesses, via the first service for the first query, a first database storing the first type of data. The system executes a second service for a second query specified by the requests based on the second query specifying a second type of data. The system accesses, via the second service for the second query, a second database storing the second type of data. The system transmits results of the first database to a user device of the first query and results of the second database to a user device of the second query.

20 Claims, 8 Drawing Sheets

(51) Int. Cl.

| | |
|---|---|
| *G06F 16/2455* | (2019.01) |
| *G06F 16/25* | (2019.01) |
| *G06F 16/29* | (2019.01) |

(56) References Cited

U.S. PATENT DOCUMENTS

| | | | |
|---|---|---|---|
| 11,068,384 B2 | 7/2021 | Zhang et al. | |
| 11,442,920 B2 | 9/2022 | Zang et al. | |
| 11,600,166 B1* | 3/2023 | Trépanier | G08B 25/006 |
| 11,704,365 B2 | 7/2023 | Li et al. | |
| 11,818,163 B2 | 11/2023 | Sharma et al. | |
| 2009/0319520 A1* | 12/2009 | Basile | G06Q 20/383 |
| | | | 707/999.005 |
| 2013/0073513 A1 | 3/2013 | Kemper et al. | |
| 2016/0078089 A1* | 3/2016 | Hu | G06F 16/21 |
| | | | 707/714 |
| 2018/0060341 A1 | 3/2018 | Wu et al. | |
| 2020/0210228 A1 | 7/2020 | Wu et al. | |
| 2021/0097067 A1 | 4/2021 | Virtuoso et al. | |
| 2021/0334312 A1 | 10/2021 | Neo et al. | |
| 2022/0043690 A1* | 2/2022 | Kondiles | G06F 16/9027 |
| 2022/0100960 A1* | 3/2022 | Therani | G06F 40/35 |
| 2022/0172211 A1* | 6/2022 | Muthuswamy | G06F 16/288 |
| 2022/0321581 A1 | 10/2022 | Sood et al. | |
| 2022/0383203 A1 | 12/2022 | Sharma et al. | |
| 2022/0414528 A1 | 12/2022 | Chhibber et al. | |
| 2022/0414529 A1 | 12/2022 | Chhibber et al. | |
| 2023/0040721 A1 | 2/2023 | Chhibber et al. | |
| 2023/0041015 A1 | 2/2023 | Chhibber et al. | |
| 2023/0072930 A1* | 3/2023 | Shah | G06F 16/244 |
| 2023/0120186 A1 | 4/2023 | Huang et al. | |
| 2023/0169068 A1* | 6/2023 | Yagoub | G06F 16/283 |
| | | | 707/609 |
| 2023/0171235 A1 | 6/2023 | Chhibber et al. | |
| 2023/0195056 A1 | 6/2023 | Sharma et al. | |
| 2023/0206108 A1 | 6/2023 | Le Van Gong et al. | |
| 2023/0206378 A1* | 6/2023 | Morrical | G06F 9/5044 |
| | | | 345/522 |
| 2023/0262074 A1 | 8/2023 | Guo et al. | |
| 2024/0176792 A1* | 5/2024 | Chen | G06F 16/283 |

\* cited by examiner

100

Request 102A
(For Querying a First
Type of Data 132)

User Device(s)
120

Request 102B
(For Querying a Second
Type of Data 142)

Results 112A
(For Request 102A)

Results 112B
(For Request 102B)

First Service
130

Second Service
140

First Type of
Data 132

Second Type of
Data 142

First Database
135

Second
Database
145

Bifurcated Computer System 110

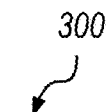

300

Geolocation Query 302A
(Specifies Coordinates
and Radius)

User Device(s)
320

Batch Geolocation Query
302B
(Sets of Coordinates and Radii)

Entities 334
(Corresponding to
Geolocation Query 302A)

Result Path
352

OLTP Service
330

OLAP Service
340

OLTP Data
332

Result Path
352

Tabular
Formatted
File 344

OLAP Data
342

OLTP Geographic
Database
335

OLAP Cluster
355

OLAP Geographic
Database
345

Bifurcated Computer System 310

*Fig. 3*

OLTP Geographic Database
435

OLTP Database Table
450

| Entity Identifier (ID) 452 | Location Information 404 |
|---|---|
| 123456789 | 38.82285, -77.035091 |
| 123456788 | 40.791, -73.9841 |
| 123456999 | 40.7801, -73.934589 |
| 123456799 | 40.7817, -73.923511 |

⋮                              ⋮

Geographic Area
440

Entities 438

Search Region
434B
(With Threshold
Number of Entities)

Search Radius
432B

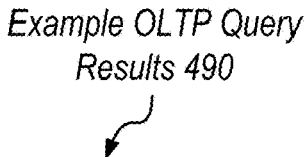
Example OLTP Query
Results 490
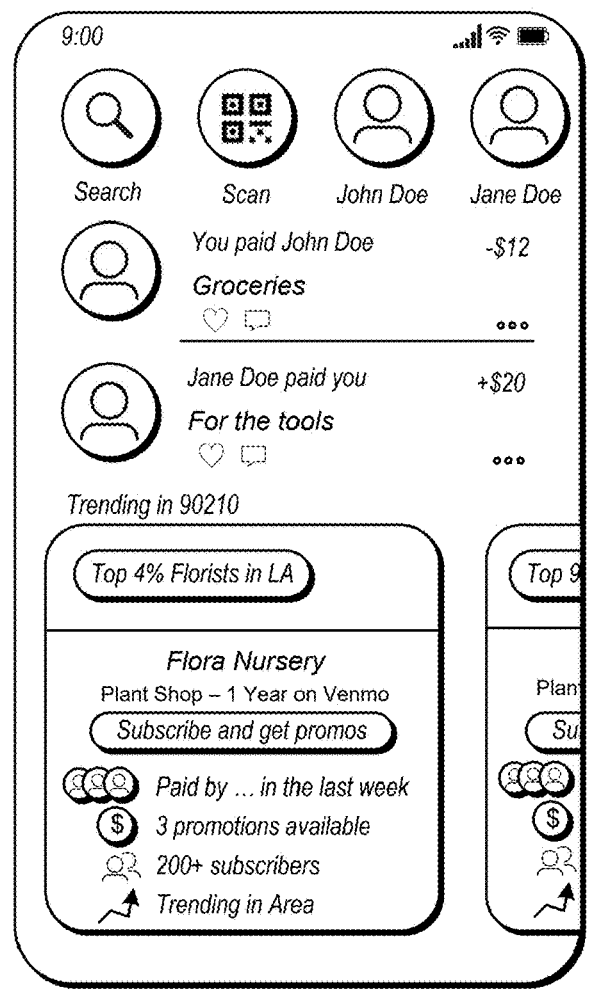
Fig. 4C

*Example OLAP*
*Query 502*

| Query Parameters 510 | latitude, longitude, radius |
|---|---|
| Tabular Formatted File 520 | Hdfs://input |
| Mapping (Columns) 530 | 0:latitude, 1:longitude |

*Example OLAP Display 560B*

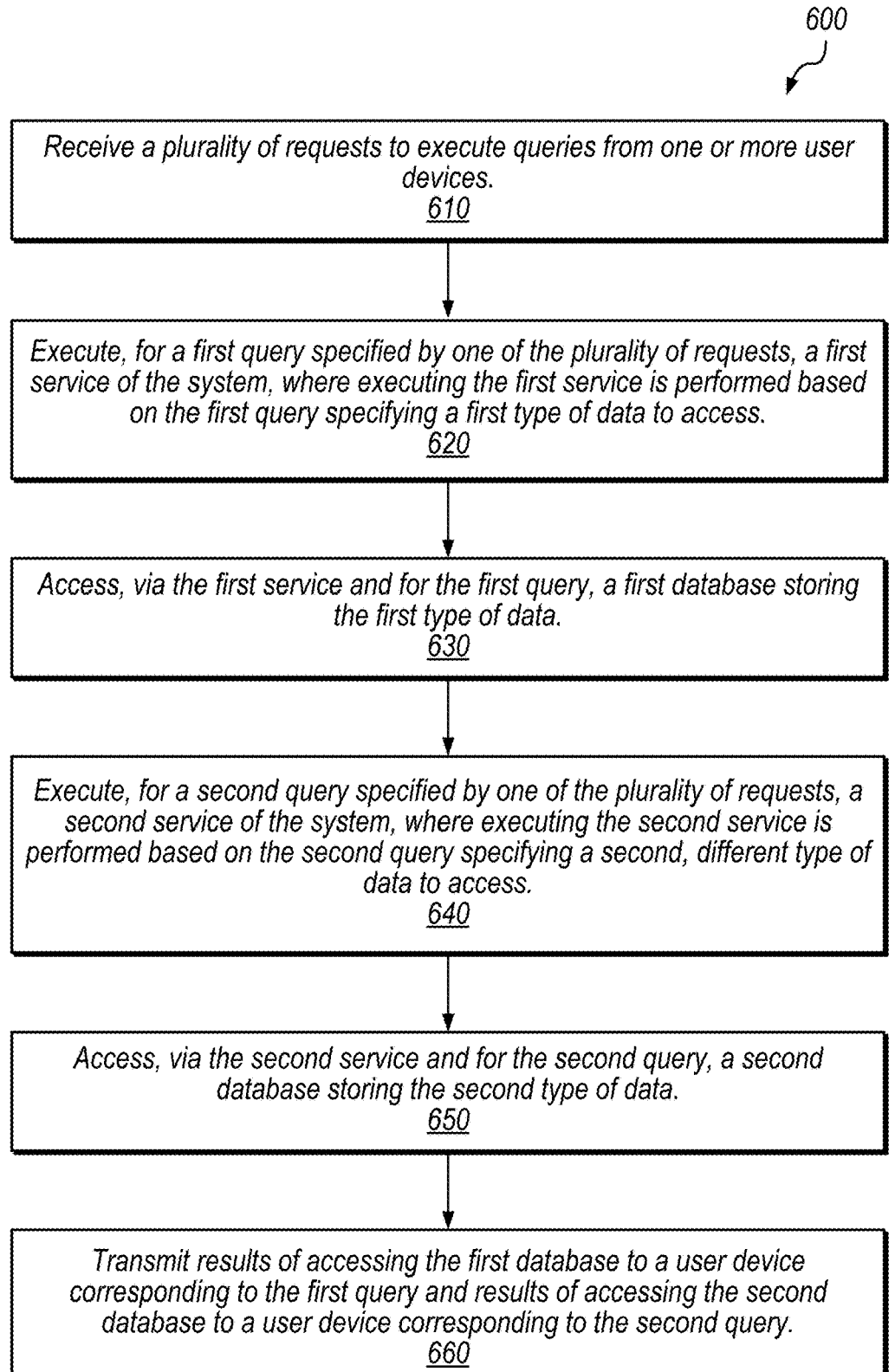

600

Receive a plurality of requests to execute queries from one or more user devices.
610

Execute, for a first query specified by one of the plurality of requests, a first service of the system, where executing the first service is performed based on the first query specifying a first type of data to access.
620

Access, via the first service and for the first query, a first database storing the first type of data.
630

Execute, for a second query specified by one of the plurality of requests, a second service of the system, where executing the second service is performed based on the second query specifying a second, different type of data to access.
640

Access, via the second service and for the second query, a second database storing the second type of data.
650

Transmit results of accessing the first database to a user device corresponding to the first query and results of accessing the second database to a user device corresponding to the second query.
660

Fig. 6

BIFURCATED SYSTEM FOR QUERYING MULTIPLE DATA TYPES

PRIORITY CLAIM

The present application claims priority to PCT Appl. No. PCT/CN2024/079228, entitled "BIFURCATED SYSTEM FOR QUERYING MULTIPLE DATA TYPES", filed Feb. 29, 2024, which is incorporated by reference herein in its entirety.

BACKGROUND

Technical Field

This disclosure relates generally to data processing, and, more specifically, to techniques for performing different types of data processing using a single bifurcated computer system, which results in improved processing efficiency and capacity, according to various embodiments.

Description of the Related Art

As more and more data (e.g., transactions, emails, messages, statistics, profiles, etc.) is processed electronically via data processing systems, for example, these processing systems become more robust in managing this data. In many situations, these data processing systems may process data either in real-time or in batches in the background. As such, these data processing systems may store both online production data and offline batch computer data. Performing these two types of data processing for different storages may require greater computer resources such as network bandwidth, storage, CPU processing, monetary resources, etc. This in turn may increase a burden of development in generating program code within a multi-storage development environment.

BRIEF DESCRIPTION OF THE DRAWINGS

FIG. 3 is a diagram illustrating an example computer system configured to perform both OLTP and OLAP data processing, according to some embodiments.

FIG. 4C is a diagram illustrating example OLTP query results, generated based on the search radius shown in FIG. 4B and the database of FIG. 4A, according to some embodiments.

FIG. 6 is a flow diagram illustrating a method for performing different types of data processing via a single bifurcated computer system, according to some embodiments.

DETAILED DESCRIPTION

Figure 1:
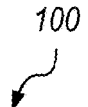
FIG. 1 is a block diagram illustrating an example bifurcated computer system configured to perform different types of data processing, according to some embodiments.

Due an ever growing amount of available data (often referred to as "big data") and faster and more convenient methods for storing data, such as to cloud computing, more and more data is available to be accessed digitally. As such, data processing systems maintain and process many different types of data in a many different ways. In some situations, data processing systems process large quantities of data at given time, e.g., in order to generate reports for analysis. In other situations, data processing systems process smaller quantities of data at a given time; however, this data is often required to be retrieved quickly.

Traditionally, data processing systems often perform different types of data processing either via two completely separate processing systems or via a single mechanism that includes a single pathway for processing multiple different types of data. In the first case, end users must submit separate processing requests to two separate interfaces and receive data from two different sources. For example, if a user would like to submit an online data processing request, they must submit their request to a first interface of a system capable of performing online processing. Similarly in this example, if the same user would like to submit an offline batch processing request, they must submit their request to a second, different interface of a different system capable of performing batch processing. In the second case, end users are able to submit both online and batch data processing requests to a single interface; however, due to the system having only a single processing pipeline, both types of data processing are performed using the same set of resources (e.g., the same processing engine and the same database). As such, the online data processing performed by this single processing pipeline may have high latency, while the batch data processing may have low throughput relative to the two separate processing systems in the first case.

To address these shortcomings, the disclosed multi-layered search system provides a platform for performing multiple different types of data processing via a single interface. For example, the disclosed bifurcated system supports both fast, online queries as well as slower, offline batch queries, including initial and incremental batch data loading. Said another way, the disclosed system provides for both low-latency online data processing and high-throughput batch processing via a single interface but via multiple backend processing pipelines that are opaque to devices interacting with the single interface. A first portion of the bifurcated system that includes a first engine and first database supports online data processing, while a second, different portion of the bifurcated system that includes a second engine and second database supports offline, batch data processing. As used herein, the term "bifurcated system" is intended to be construed according to its well-understood meaning, including a computer system that includes two separate portions. As discussed in further detail below, a bifurcated computer system includes two separate engines and two separate databases configured to perform two different types of data processing via a single user interface endpoint. The disclosed computer system performs two types of data processing utilizing two internal separate portions that are not visible to end users and other systems accessing the bifurcated computer system. For example, the two separate processing pipelines are on the backend of the bifurcated system and are not transparent to devices accessing the system.

The disclosed multi-layer system may advantageously enable queries and computer operations for both online querying and offline batch analysis. For example, the disclosed bifurcated system provides a single interface endpoint, but processes different queries (e.g., both online transaction processing (OLTP) and offline analytical processing (OLAP) as discussed in further detail below) received at this single input via a multi-storage, multi-execution engine design. Said another way, the disclosed system provides for both stream event data processing (real-time data) and offline data processing (batch data) via a single endpoint.

In addition to providing for different types of data processing, the disclosed system advantageously allows for separate scalability of its two different portions. For example, the disclosed bifurcated system is able to increase the capacity and computing resources of one of its portions without needing to alter the other portion. As one specific example, the bifurcated system might increase the processing power of its online, real-time processing portion during a high-traffic time of year (e.g., during Black Friday) while leaving the offline, batch processing portion as is. Separate scalability of the two portions may advantageously decrease the amount of computing resources necessary to perform two different types of processing (e.g., by only scaling one portion at a time). This, in turn, may decrease the amount of time needed to complete either online or offline data processing requests (e.g., the online data processing may satisfy various service level agreements (SLA) agreements). As discussed in further detail below with reference to FIG. 2, the disclosed bifurcated system provides both a uniform schema and end user experience as well as a uniform design (e.g., an integrated design in production).

Example Bifurcated Computer System

FIG. 1 is a block diagram illustrating an example bifurcated computer system configured to perform different types of data processing. In the illustrated embodiment, system 100 includes one or more user devices 120 and a bifurcated computer system 110, which in turn includes a first service 130 and a first database 135, and a second service 140 and a second database 145. The first service 130 may be an online data processing service and the second service 140 may be an offline data processing service In the illustrated embodiment, bifurcated computer system 110 receives requests 102A and 102B from one or more user devices 120 for querying a first type of data 132 and for querying a second type of data 142, respectively. In some embodiments, requests 102A and 102B are received from the same user device 120. For example, a user device might first submit a first query for online data processing and also submit a second, different query for offline batch data processing. In other embodiments, requests 102A and 102B are received from two different user devices 120.

As discussed in further detail below, request 102A may be a query requesting to perform online processing of data, while request 102B may be a query requesting to perform offline batch processing of data. A user of a first device 120 submits an online (real-time) search query and, in this example, system 110 returns a result immediately (i.e., in real-time) to the first device 120. In contrast, a user of a second, different device 120 submits an offline batch query, in this example the results of the batch query will not be returned by system 110 immediately, but rather will be much slower to be returned to the second device 120 than the results of the online, real-time query. As one specific example, request 102A may be an online transaction processing (OLTP) request specifying a small set of data to retrieve quickly, while request 102B may be an online analytical processing (OLAP) request specifying a large batch of data to retrieve asynchronously (e.g., in the background). Such example queries are discussed in further detail below with reference to FIG. 3. Computer system 110, in the illustrated embodiment, separately executes first service 130 to process request 102A and second service 140 to process request 102B.

First service 130, in the illustrated embodiment, accesses first database 135 to retrieve first type of data 132 for request 102A. After retrieving first type of data 132, first service 130 transmits results 112A to a user device 120 corresponding to request 102A. First service 130 may transmit results 112A real-time with receiving request 102A. For example, request 102A may be received and seconds later (e.g., according to a time threshold specified in a service level agreement (SLA)), first service 130 transmits results 112A to a user device 120 corresponding to request 102A. In various embodiments, first service 130 performs a first type of query on first database 135 in real-time with receiving request 102A based on one or more query parameters specified in request 102A.

In some embodiments, request 102A includes a request to perform read operations on first database 135. In other embodiments, request 102A includes a request to perform write operations on first database 135. As discussed in further detail below with reference to FIGS. 4A-4C, request 102A may specify one or more search parameters for locating entities geographically near a device 120 corresponding to request 102A. In contrast, in other situations, request 102A may specify one or more values for an entity to be stored in database 135. For example, request 102A may specify a geographic location of a new entity that has recently been onboarded and whose information needs to be added to the database for future online and batch processing.

As discussed in further detail below with reference to FIG. 3, first service 130 may be an online data processing service (e.g., an OLTP service) that processes data in real time with receiving queries (e.g., first service 130 finishes processing a request seconds or minutes after it is received). When retrieving first type of data 132 from first database 135, first service 130 may retrieve key-value pairs from the database. For example, first database 135 may be a non-relational database, such as Aerospike™, storing rows of the first type of data 132 as key-value pairs.

Second service 140, in the illustrated embodiment, accesses second database 145 to retrieve a second type of data 142 for request 102B. After retrieving second type of data 142, second service 140 transmits results 112B to a user device 120 corresponding to request 102B. Second service 140 may transmit results 112B at a much later time after receiving request 102B. For example, request 102B may be received at a given time and then hours (or days) later, second service 140 transmits results 112B to a user device 120 corresponding to request 102B. In some embodiments, second service 140 transmits a notification to a user device 120 corresponding to request 102B indicating that the batch data is available for the device 120 to access. For example, second service 140 retrieves second type of data 142 and store it at a given location (e.g., at a database cache or cluster) and notifies the device 120 of the given location at which the retrieved second type of data 142 can be accessed (as discussed in further detail below with reference to FIG. 3). In the example, second service 140 transmits results that include a result path indicating a location within database 145, or another database cluster as discussed in further detail below with reference to FIG. 3, to a user device 120. Similar to the query performed by first service 130, second service 140 performs a second type of query on second database 145 in an offline batch manner based on one or more parameters specified in request 102B.

In some embodiments, request 102B includes a request to perform read operations on second database 145. In other embodiments, request 102B includes a request to perform write operations on second database 145. As discussed in further detail below with reference to FIGS. 3 and 5A-5B, request 102B may specify one or more search parameters for locating a plurality of entities for further analysis. In contrast, in other situations, request 102B may specify values for a plurality of entities to be stored in database 145. For example, request 102B may specify geographic locations of a plurality of new entities currently being onboarded by the disclosed system (and whose information needs to be added to the database for future online and batch processing). In such situations, request 102B may specify addresses or zip codes for the different entities, and second service 140 first determines geographic locations (latitudes and longitudes) corresponding to the addresses or zip codes and then stores the geographic locations in second database 145.

Similar to first service 130, when retrieving second type of data 142 from second database 145, second service 130 may retrieve hundreds of key-value pairs from database second database 145. For example, second database 145 may be a large-scale column-oriented non-relational database, such as Apache Hbase™ (which runs on top of Hadoop Distributed File System (HDFS)), storing rows of the second type of data 142 as key-value pairs.

In some embodiments, computer system 110 performs write operations on both second database 145 and first database 135 based on one or both of request 102A or 102B. For example, the bifurcated computer system 110 provides a uniform data ingestion layer for multiple types of data processing by implementing a uniform schema for both first database 135 and second database 145. As such, any changes that system 110 implements by writing to one side of the system (e.g., the first side), the system 110 will also implement the same or similar changes (write operations) to the other side of the system (e.g., the second side). In this way, bifurcated computer system 110 is able to maintain data consistency between its two separate layers as discussed in further detail below with reference to FIG. 2.

In disclosed techniques, first service 130 and second service 140 are microservices. As used herein, the term "microservices" is intended to be construed according to its well-understood meaning, including an architectural and organizational approach to software development in which the software itself is composed of small, independent services that are independently deployable and that are loosely coupled such that they can communicate with one another via application programming interfaces (APIs).

Example Data Validation

Figure 2:
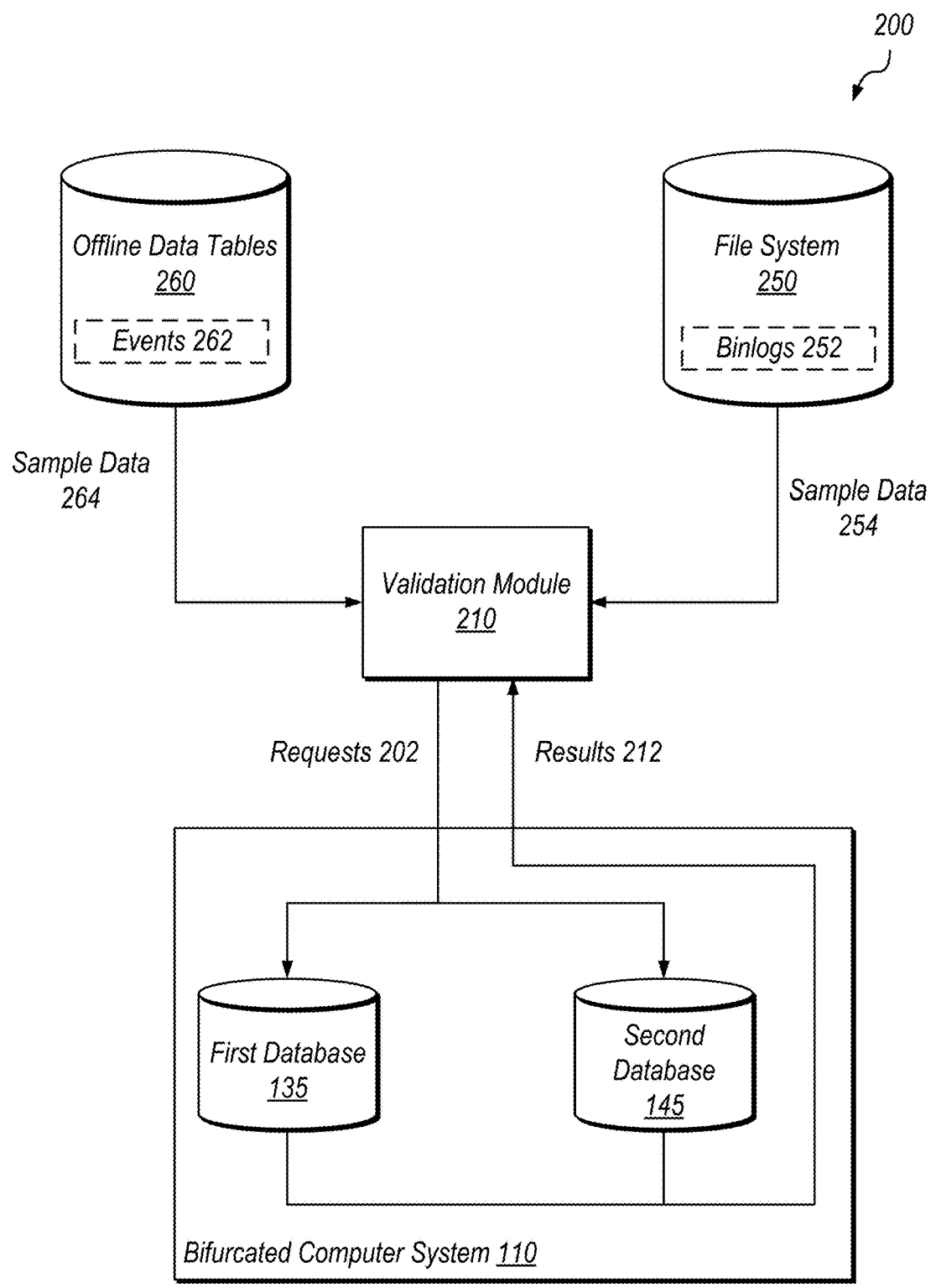
FIG. 2 is a block diagram illustrating example data validation for the bifurcated system of FIG. 1, according to some embodiments.

FIG. 2 is a block diagram illustrating example data validation for the bifurcated system of FIG. 1. In the illustrated embodiment, system 200 includes offline data tables 260, a file system 250, validation module 210, and bifurcated computer system 110, which in turn includes first database 135 and second database 145. In some embodiments, system 200 is a database management system configured to validate and maintain consistency of data across multiple data sources. For example, system 200 executes validation module 210 to ensure eventual data consistency between the two storage engines (first database 135 and second database 145) through both single and cross-source data validation. For example, validation module 210 runs a regular validation job periodically to ensure eventual data consistency between offline data tables 260 and file system 250 and first and second databases 135 and 145.

In the illustrated embodiment, validation module 210 receives sample data 264 from offline data tables 260 sample data 254 from file system 250. File system 250 may be a distributed file system (e.g., Apache Hadoop File System (HDFS)™, Google BigQuery™, Apache Cassandra™, etc.). For example, data that is stored by the bifurcated computer system 110 in both first database 135 and second database 145 may be received from several online (e.g., production streaming events) or offline (e.g., batch storage) data sources. In this example, after a new online job is finished (e.g., a new stream event is finished processing), file system 250 transmits sample data 254 for the new online job based on its binary logs (binlogs) 252 which include records of changes made to a database (changes made to file system 250 by new online events). Further in this example, offline data tables 260 store a plurality of different previously occurring events 262 (such as previously processed online jobs of file system 250) and periodically (e.g., hourly, daily, monthly, etc.) transmit sample data 264 to validation module 210 according to a schedule.

Validation module 210, in the illustrated embodiment, transmits requests 202, based on sample data 264 and sample data 254, to first database 135 and second database 145, respectively. Requests 202 may specify one or more changes to be made to first database 135 or second database 145 according to different sample data 264 and 254 received by validation module 210. For example, validation module 210 transmits one or more database operations (e.g., create, read update, and delete (CRUD) operations) to first and second databases 135 and 145 based on sample data 264 and 254. First database 135 and second database 145 transmit results 212 back to validation module 210 for the one or more database operations specified in requests 202. As one example, if sample data 254 indicates that ten new online events have occurred since a previous validation performed by validation module 210, module 210 transmits a request 202 to first database 135 and second database 145 to write new data to these databases according to the ten new events that occurred. In this way, validation module 210 periodically checks whether data stored in databases 135 and 145 is up-to-date (to ensure uniform data freshness for both online and offline data storage), particularly since these databases store data from multiple different types of data sources.

In this disclosure, various "modules" operable to perform designated functions are shown in the figures and described in detail (e.g., validation module 210). As used herein, a "module" refers to software or hardware that is operable to perform a specified set of operations. A module may refer to a set of software instructions that are executable by a computer system to perform the set of operations. A module may also refer to hardware that is configured to perform the set of operations. A hardware module may constitute general-purpose hardware as well as a non-transitory computer-readable medium that stores program instructions, or specialized hardware such as a customized ASIC. In some situations, the first service 130 and second service 140 shown in FIG. 1 and discussed in detail above may also be referred to as "modules."

Example OLTP and OLAP System

Turning now to FIG. 3, an example computer system configured to perform both OLTP and OLAP data processing is depicted. In the illustrated embodiment, example 300 includes one or more user devices 320 and a bifurcated computer system 310 (one example of computer system 110), which in turn includes OLTP service 330 and OLTP geographic database 335 and OLAP service 340 and OLAP geographic database 345.

User device(s) 320 provide access to bifurcated computer system 310 via any of various applications and platforms operated by an entity corresponding to system 310 (e.g., applications and platforms operated by PayPal™). For example, a user of a device 320 may open an application in order to access geolocation data maintained by system 310 either in real-time (e.g., locate nearby merchants within the Venmo™ application) via OLTP service 330 or offline (e.g., perform a density analysis for merchants via a batch compute application).

OLTP service 330, in the illustrated embodiment, receives a geolocation query 302A that specifies coordinates (latitude and longitude) and a search radius. OLTP service 330 performs online, real-time data processing to quickly retrieve OLTP data 332 from OLTP geographic database 335 based on the parameters specified in geolocation query 302A. For example, OLTP service 330 executes a K-nearest neighbor (KNN) query on OLTP geographic database 335 to retrieve entities that are located within a geographic area, the center of which corresponds to the coordinates specified by query 302A and whose radius corresponds to the radius specified in query 302A. In various embodiments, OLTP service 330 retrieves OLTP data 332 from OLTP geographic database 335 by submitting a key-value request to the database and receiving a key-value response from the database. For example, a key-value response includes a key-value pair including an entity identifier and location information corresponding to the entity identifier similar to the database table entries shown in FIG. 4A and discussed in further detail below. Further in this example, a key-value request might include the entity identifier of an entity the disclosed system is attempting to locate. In the illustrated embodiment, OLTP service 330 transmits a list of entities 334 located within an area corresponding to the coordinates and radius specified in query 302A as discussed in further detail below with reference to FIGS. 4A-4C.

In various embodiments, the online processing performed by OLTP service 330 handles recent operation data for either storing or retrieving small amounts of data (e.g., between 100 megabytes and 10 gigabytes) to or from OLTP geographic database 335. The online processing performed by OLTP service 330 is generally performed for simple, fast data processing requiring either read or write operations.

OLAP service 340, in the illustrated embodiment, receives a batch geolocation query 302B that specifies a plurality of sets of coordinates and radii for locating a batch of OLAP data 342 stored in OLAP geographic database 345. For example, OLAP service 340 executes a large batch query on OLAP geographic database 345 according to the sets of coordinates and radii specified in query 302B to retrieve OLAP data 342. In the illustrated embodiment, after retrieving OLAP data 342 from database 345, OLAP service 340 generates and sends a tabular formatted file 344 (storing retrieved OLAP data 342) to OLAP cluster 355 for storage. The tabular formatted file 344 may be a comma separated values (CSV) file, for example. Tabular formatted file 344 includes different sets of entities corresponding to the sets of coordinates and radii specified in batch query 302B, as discussed in further detail below with reference to FIGS. 5A and 5B.

In response to receiving the tabular formatted file 344, OLAP cluster 355 transmits a result path 352 indicating the file path to use to locate the tabular formatted file 344 stored in cluster 355. OLAP service 340, in the illustrated embodiment, transmits the result path 352 to the user device 320 corresponding to query 302B. The result path 352 is usable by the user device 320 to locate and retrieve the tabular formatted file 344 from OLAP cluster 355. In some embodiments, the tabular formatted file 344 includes mapping information indicating a column for storing latitudes of entities and a column for storing longitudes of entities included in the OLAP data 342 retrieved from database 345 via batch query 302B. In various embodiments, the mapping information is submitted as a resource file with the batch query (e.g., query 302B) for storage of retrieved batch data.

The analytical processing performed by OLAP service 340 is often referred to as batch processing and involves more complex queries than OLTP data processing and is also generally performed at slower processing speeds. In some embodiments, OLAP queries are primarily read operations. Some OLAP queries performed by OLAP service 340, however, may write large batches of data to OLAP geographic database 345. For example, a batch query submitted to OLAP service 340 may include data from several years for a new client of system 310 when this new client is being onboarded.

In contrast to the online processing performed by OLTP service 330, OLAP service 340 performs online analytical processing for large amounts of historical data (e.g., between 1 terabyte and 100 petabytes) stored in large data sources. That is, while the OLTP processing performed by OLTP service 330 involves a single KNN search performed on database 335 to retrieve all of the entities (e.g., merchants) located within a single location, the OLAP processing performed by OLAP service 340 involves multiple KNN searches (e.g., hundreds, thousands, etc.) performed on database 345 to retrieve different sets of entities located in different geographic locations. As such, in this example OLTP queries specify a single set of location parameters (a single set of coordinates and a single radius) and OLAP queries specify multiple sets of location parameters (multiple sets of coordinates and multiple different radii). One example of OLAP processing that service 340 might perform involves a daily batch analysis in order for a user (that triggered the daily analysis) to perform a geographic location-based transaction analysis (e.g., determine which geographic locations have high electronic transaction traffic, which merchants are popular based on high electronic traffic at these merchants).

In some embodiments, bifurcated computer system 310 scales one or both of its separate branches. Because system 310 includes separate services 330 and 340 for OLTP and OLAP data processing (as well as separate databases 335 and 345 for each), this system may advantageously scale each branch separately and at different times according to different processing needs. For example, during the holiday season, system 310 may greatly increase the processing resources of OLTP service 330 and the storage capacity of OLTP geographic database 335 in order to better handle a greater number of OLTP requests (e.g., due to higher electronic transaction traffic in various geographic locations). In this example, however, system 310 does not have to scale the OLAP branch since this portion of the system is maintained and operated separately from the OLTP branch. In contrast, if system 310 were to onboard a new entity (e.g., a new merchant that has years of data to be loaded into the system), system 310 could scale up the OLAP branch temporarily (without having to scale the OLTP branch) to more efficiently load large batches of data for the new entity during onboarding.

In various embodiments, in order for the disclosed bifurcated computer system (e.g., system 110 shown in FIG. 1) to perform online queries quickly, the system must first load batch data into OLAP database 345 and then perform analysis of the batch data via OLAP queries. For example, after performing a batch analysis of data stored in OLAP database 345, the system may index the data by storing the data in OLTP geographic database 335. In this way, the OLTP database acts as an index for OLAP geographic database 345. The batch loading allows for initial and incremental onboarding of new entities (e.g., merchants) including their geographic location information, removal of outdated entities (e.g., merchants that closed their business), batch analysis according to different entities' information (e.g., determining merchants near a given user that are currently offering promotions), performing batch analysis of previous user interactions with the entities (e.g., to understand customer interests and behaviors in order to provide better quality recommendations or promotions to the user via OLTP queries).

Note that the data stored in first database 135 and second database 145 and maintained by bifurcated computer system 110 could be data for any of various types of applications. The embodiment in which the data stored is geographic data is one non-limiting example embodiment of the data that may be processed by computing system 110. In various embodiments, computing system 110 may process: geographic location data (e.g., merchant location information, including promotions), network graph data (e.g., for electronic transactions, including monetary transactions, promotions, etc.), risk data (e.g., entities identified as suspicious or potentially malicious), traffic data (e.g., for navigation, car rental services, etc.), etc. Thus, while various examples are described below with respect to geographic data, the disclosed techniques are not limited to such types of data.

Example Online Processing

Figure 4A:
FIGS. 4A and 4B are diagrams illustrating an example OLTP geographic database and an example geographic area, respectively, according to some embodiments.
Figure 4B:
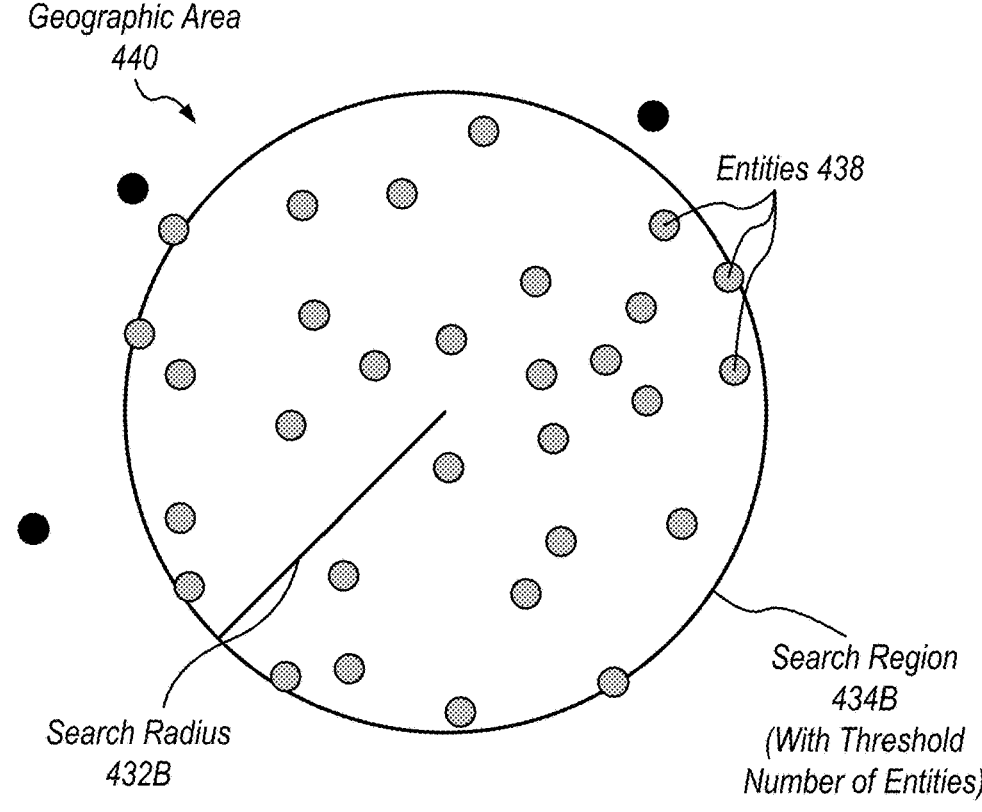

FIGS. 4A and 4B are diagrams illustrating an example OLTP geographic database and an example geographic area, respectively. The OLTP geographic database 435 shown in FIG. 4B includes an OLTP database table 450 storing geographic location data for a plurality of entities. The example geographic area 440 shown in FIG. 4B is one example of the disclosed processing of OLTP data. Note that the OLTP example shown in FIGS. 4A and 4B may also be performed for other types of data such as transaction network graph data. In such situations, the data stored in OLTP database will be transaction data for a plurality of different entities (e.g., merchants, users, organization, etc.), while the example geographic area shown in FIG. 4B might show an example transaction network graph used to determine various characteristics or statistics for different transactions (e.g., in order to perform risk prevention).

In FIG. 4A, an example of geographic database 435 (one example of first database 135 shown in FIG. 1) is shown which includes a database table 450. OLTP Geographic database 435 is a non-relational database (e.g., Aerospike™, Apache Cassandra™, MongoDB™, etc.) that stores data as key-value pairs. In the illustrated embodiment, database table 450 stores rows of key-value pairs, where the key column of the table stores values for various entity identifiers (IDs) 452 and the value column of the table stores location information 404 for the entities identified by entity IDs 452. For example, database table 450 stores geographic coordinates (such as latitude and longitude) for various different entities. Database table 450, in the illustrated embodiment, includes a first row that stores an entity ID 252 for entity 123456789, located at 38.82285, −77.035091. Similarly, database table 450 stores geographic coordinates indicating the geographic locations of several different entities including entities identified by the following entity IDs 252: 123456788, 123456999, 123456799, etc.

In FIG. 4B, a geographic area 440 is shown with a search radius 432B that encompasses a plurality of entities 438 located in geographic area. As shown in FIG. 4B, a search radius 432B is utilize to define a search region 434B within which to perform a geolocation query to locate one or more entities 438 to display to an end user. Search radius 432B, for example, is selected (by first service 130) to satisfy the entity threshold requirement (e.g., a query must return 20 or more entities). In the illustrated embodiment, search region 434B for geographic area 440 encompasses 30 entities, which satisfies the example entity threshold requirement of 20 entities. The search results shown in FIG. 4B are results of performing a kNN search query on OLTP geographic database 435. The kNN query parameters include a geographic location of an end user and an entity threshold requirement (i.e., k entities located nearest to a geographic location specified by the latitude and longitude of the end user, where k is a number greater than zero). In various embodiments, the first service 130 of bifurcated computer system 110 shown in FIG. 1 performs a plurality of different KNN queries for a plurality of different end users based on their different locations.

FIG. 4C is a diagram illustrating example OLTP query results, generated based on the search radius shown in FIG. 4B and the database table of FIG. 4A. For example, the disclosed techniques support locating k-closest entities to a device in response to the device opening an application on their phone (e.g., a user opens the Venmo app on their phone). In the illustrated embodiment, example OLTP query results 490 are displayed on a computing device (e.g., a smartphone, wearable device, tablet, etc.) of an end user. For example, if a user of the computing device shown in FIG. 4C submits a request to perform an action by opening the Venmo™ application on their device. In response to the user opening the application on their phone, the application submits a request to the disclosed computer system (e.g., a server of PayPal™) to perform an OLTP query. In this example, the OLTP query specifies to locate entities within a geographic circumference defined by a given latitude, longitude, and radius. The server system transmits results of the OLTP query to the user's device, and the device displays the results to the user via the application (e.g., the results as shown in FIG. 4C). In FIG. 4C, the OLTP query results displayed in a user's computing device show a top florist "Flora Nursery" trending in the zip code 90210 that is located near the computing device of the user. For example, Flora Nursery is located within a radius of the latitude and longitude location of the user's device and the radius is specified in the OLTP query performed in response to the user opening the application.

Example Batch Processing

Figures 5A, 5B:
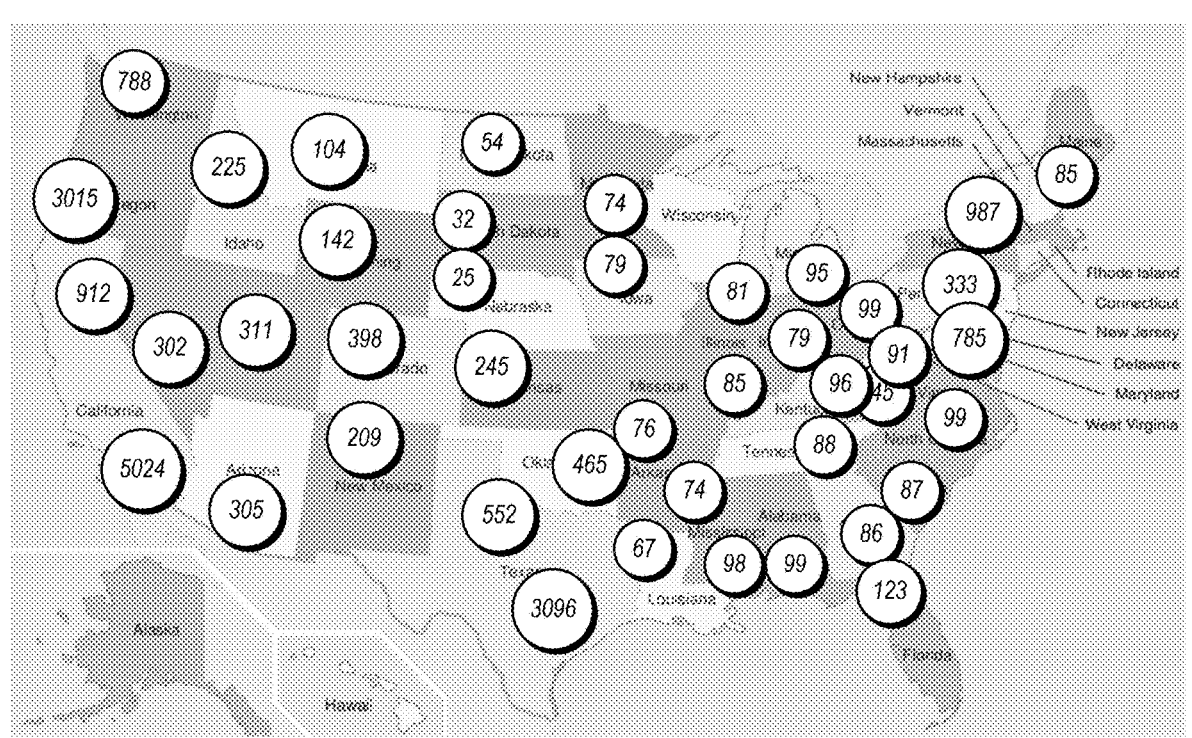
FIG. 5A is a diagram illustrating an example OLAP batch query, according to some embodiments.
FIG. 5B is a diagram illustrating an example display of results of an example OLAP batch query, according to some embodiments.

Turning now to FIG. 5A, an example OLAP batch query is depicted. In FIG. 5A, an example OLAP query 502 is shown including query parameters 510, a tabular formatted file 520, and mapping information 530. OLAP query 502 is one example of the batch geolocation query 302B submitted by a user device 320 to OLAP service 340 as shown in FIG. 3.

In the illustrated embodiment, the query parameters 510 included in OLAP query 502 specify that the parameters for each set of a plurality of sets of entity searches include three values: a latitude, longitude, and a radius. For example, OLAP query 502 may search for a batch of data, where a first set of data in the batch is for entities located near San Jose, California, while a second set of data in the batch is for entities located near Austin, Texas. In this example, the first set of data has a latitude and longitude for San Jose, California and a search radius indicating a size of a search region around the latitude and longitude for San Jose in which to search for entities. In contrast, in this example, the second set of data has a different latitude and longitude for Austin, Texas and a different search radius indicating the size of a search region around the latitude and longitude for Austin in which to search for entities. In the illustrated embodiment, example batch query 502 includes an example tabular formatted file 520 that includes a result path specifying the location of the file 520 in which batch data is stored within OLAP cluster 355 (shown in FIG. 3). Query 502 also includes mapping information 530 indicating which column within the tabular formatted file 520 stores latitude data (i.e., column 0) and which column stores longitude data (i.e., column 1).

While FIGS. 5A and 5B do not show example tables that might be stored in an OLAP geographic database (such as database 345), the OLAP geographic database may store data in tables similar to the example OLTP database table 450 shown in FIG. 4A. For example, as discussed above with reference to FIG. 4A, OLTP geographic database 435 is a non-relational database that stores data as key-value pairs similar to first database 135 (or OLTP geographic database 335). Similarly, an OLAP geographic database upon which OLAP query 502 is executed, may also be a non-relational database that stores data as key-value pairs. The OLAP database (such as OLAP database 345), however, may store a much larger amount of entity geographic location information than the OLTP database 435. For example, while an OLAP database might store geographic location information for all current entities that the disclosed bifurcated computer system has onboarded, an OLTP database might store geographic location information for only a subset of the current entities (e.g., entities that have recently been displayed to users). In this way, an OLTP database might act as an index for the OLAP database. Thus, the batch query shown in FIG. 5A may be executed against tables similar to the table 450 shown in FIG. 4A.

In FIG. 5B, an example display of results of an OLAP batch query is shown. In FIG. 5B, an example display 560B generated based on entity location data stored in a tabular formatted file 520 is shown. OLAP display 560B may be generated from the location data stored in file 520 and then displayed via a user interface of a user device (e.g., user device 120 shown in FIG. 1) for further analysis. In FIG. 5B, OLAP display 560B includes a plurality of circles with numbers indicating a number of entities located geographically near the location of the circles placed at different geographic locations within the United States. As shown in OLAP display 560B, Texas and California have a greater concentration of entities (e.g., merchants) than other states, such as Alabama or Louisiana.

Example Method

FIG. 6 is a flow diagram illustrating a method for performing different types of data processing via a single bifurcated computer system, according to some embodiments. The method shown in FIG. 6 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired. According to various embodiments, some or all elements of FIG. 6 may be performed by bifurcated computer system 110.

At 610, in the illustrated embodiment, a system receives, from one or more user devices, a plurality of requests to execute queries. In some embodiments, the plurality of requests are received via a single user interface of the bifurcated computer system, where the single user interface includes a user interface element capable of receiving user input specifying the first type of data or the second, different type of data.

At 620 the system executes, for a first query specified by one of the plurality of requests, a first service of the system, where executing the first service is performed based on the first query specifying a first type of data to access. In some embodiments, executing the first service for the first query to retrieve geolocation data from the first database includes performing a kNN search query on the first database, where a search region of the kNN search query is a circle with a minimum radius that encompasses a number of entities that satisfies an entity threshold requirement. In some embodiments, the number of entities are located in geographic locations that fall within a circumference of the circle.

At 630, the system accesses, via the first service and for the first query, a first database storing the first type of data. In some embodiments, the first type of query processes data in real-time and the second type of query performs batch processing. In some embodiments, the first service is an online transaction processing (OLTP) service and the second service is an online analytical processing (OLAP) service, where the first query is an OLTP query and the second query is an OLAP query.

At 640, the system executes, for a second query specified by one of the plurality of requests, a second service of the system, where executing the second service is performed based on the second query specifying a second, different type of data to access. In some embodiments, the first type of query retrieves real-time data that is processed in real-time and the second type of query retrieves batch data that is processed in batches. In some embodiments, the first service is an online transaction processing (OLTP) service and the second service is an online analytical processing (OLAP) service, where the first type of data is OLTP data and the second type of data is OLAP data. In some embodiments, the second query specified by one of the plurality of requests includes receiving a tabular formatted file specifying a plurality of sets of search parameters, where a given set of search parameters specifies coordinates for a geographic location and a minimum radius surrounding the geographic location.

At 650, the system accesses, via the second service and for the second query, a second database storing the second type of data. In some embodiments, the first database and the second database are implemented using the same database schema. In some embodiments, the data retrieved by the first query from the first database includes geolocation data, where the first database is a non-relational database storing the geolocation data as key-value pairs. In some embodiments, a given entry in the non-relational database includes a key storing an entity identifier corresponding to an entity and a value storing a latitude and longitude indicating a geographic location of the entity. In other embodiments, the data retrieved by the first query from the first database includes transaction network graph data, where the first database is a non-relational database storing the transaction network graph data as key-value pairs. In some embodiments, a given entry in the non-relational database includes a key storing an entity identifier corresponding to an entity and a value storing transaction data indicating information for a given transaction executed for the entity, including a transaction identifier.

At 660, the system transmits results of accessing the first database to a user device corresponding to the first query and results of accessing the second database to a user device corresponding to the second query. In some embodiments, transmitting the results of accessing the first database is performed before transmitting the results of accessing the second database, where an amount of data returned in the results of accessing the second database is larger than an amount of data returned in the results of accessing the first database. For example, the processing of OLTP data by the system results in a lower latency than the processing of OLAP data. Further in this example, the processing of the OLAP data by the system results in a higher throughput than the processing of the OLTP data. In some embodiments, transmitting results of accessing the second database includes transmitting a notification that includes a location path indicating a location at which data retrieved from the second database is store. For example, the system may retrieve a batch of data from the second database and store the batch of data in a cache or database cluster. In this example, the system sends an access result path to the user device for which it retrieved the batch data, letting the user know that they can access the batched data via the access result path (as discussed in detail above with reference to FIG. 3)

Example Computing Device

Figure 7:
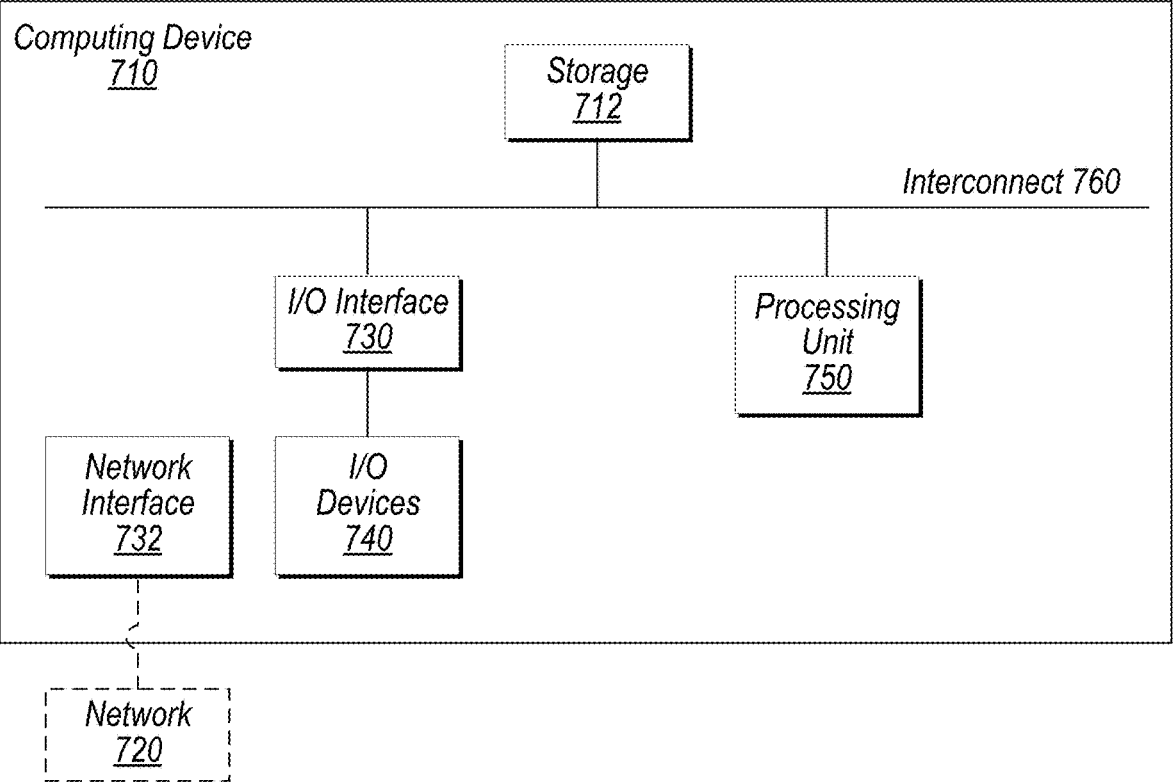
FIG. 7 is a block diagram illustrating an example computing device, according to some embodiments.

Turning now to FIG. 7, a block diagram of one embodiment of computing device 710 (which may also be referred to as a computing system) is depicted. Computing device 710 may be used to implement various portions of this disclosure. Computing device 710 may be any suitable type of device, including, but not limited to, a personal computer system, desktop computer, laptop or notebook computer, mainframe computer system, web server, workstation, or network computer. The system 100, computer system 110, and user devices 120, shown in FIG. 1 and discussed above, are different examples of computing device 710. As shown in FIG. 7, computing device 710 includes processing unit 750, storage 712, and input/output (I/O) interface 730 coupled via an interconnect 760 (e.g., a system bus). I/O interface 730 may be coupled to one or more I/O devices 740. Computing device 710 further includes network interface 732, which may be coupled to network 720 for communications with, for example, other computing devices.

In various embodiments, processing unit 750 includes one or more processors. In some embodiments, processing unit 750 includes one or more coprocessor units. In some embodiments, multiple instances of processing unit 750 may be coupled to interconnect 760. Processing unit 750 (or each processor within 750) may contain a cache or other form of on-board memory. In some embodiments, processing unit 750 may be implemented as a general-purpose processing unit, and in other embodiments it may be implemented as a special purpose processing unit (e.g., an ASIC). In general, computing device 710 is not limited to any particular type of processing unit or processor subsystem.

Storage subsystem 712 is usable by processing unit 750 (e.g., to store instructions executable by and data used by processing unit 750). Storage subsystem 712 may be implemented by any suitable type of physical memory media, including hard disk storage, floppy disk storage, removable disk storage, flash memory, random access memory (RAM-SRAM, EDO RAM, SDRAM, DDR SDRAM, RDRAM, etc.), ROM (PROM, EEPROM, etc.), and so on. Storage subsystem 712 may consist solely of volatile memory, in one embodiment. First database 135 and second database 145, discussed above with reference to FIG. 1 are examples of storage subsystem 712. Storage subsystem 712 may store program instructions executable by computing device 710 using processing unit 750, including program instructions executable to cause computing device 710 to implement the various techniques disclosed herein.

I/O interface 730 may represent one or more interfaces and may be any of various types of interfaces configured to couple to and communicate with other devices, according to various embodiments. In one embodiment, I/O interface 730 is a bridge chip from a front-side to one or more back-side buses. I/O interface 730 may be coupled to one or more I/O devices 740 via one or more corresponding buses or other interfaces. Examples of I/O devices include storage devices (hard disk, optical drive, removable flash drive, storage array, SAN, or an associated controller), network interface devices, user interface devices or other devices (e.g., graphics, sound, etc.).

Various articles of manufacture that store instructions (and, optionally, data) executable by a computing system to implement techniques disclosed herein are also contemplated. The computing system may execute the instructions using one or more processing elements. The articles of manufacture include non-transitory computer-readable memory media. The contemplated non-transitory computer-readable memory media include portions of a memory subsystem of a computing device as well as storage media or memory media such as magnetic media (e.g., disk) or optical media (e.g., CD, DVD, and related technologies, etc.). The non-transitory computer-readable media may be either volatile or nonvolatile memory.

The present disclosure includes references to "an embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more of the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

What is claimed is:

1. A method, comprising:
receiving, by a bifurcated computer system from one or more user devices, a plurality of requests to execute queries;
executing, by the system for a first query specified by one of the plurality of requests, a first service included in a first processing pipeline of the system, wherein executing the first service is performed based on the first query specifying a first type of data to access, and wherein the first type of data is real-time data;
accessing, by the system via the first service and for the first query, a first database, wherein the first database is included in the first processing pipeline of the system and stores the first type of data;
executing, by the system for a second query specified by one of the plurality of requests, a second service included in a second, separate processing pipeline of the system, wherein executing the second service is performed based on the second query specifying a second, different type of data to access, and wherein the second, different type of data is batch data;
accessing, by the system via the second service and for the second query, a second database, wherein the second database is included in the second processing pipeline of the system and stores the second, different type of data; and
transmitting, by the system, results of accessing the first database to a user device corresponding to the first query and results of accessing the second database to a user device corresponding to the second query.

2. The method of claim 1, wherein the accessing for the first type of query includes retrieving the real-time data and the accessing for the second type of query includes retrieving the batch data.

3. The method of claim 1, wherein the first service is an online transaction processing (OLTP) service and the second service is an online analytical processing (OLAP) service, and wherein the real-time data is OLTP data and the batch data is OLAP data.

4. The method of claim 1, wherein transmitting the results of accessing the first database is performed before transmitting the results of accessing the second database, and wherein an amount of data returned in the results of accessing the second database is larger than an amount of data returned in the results of accessing the first database.

5. The method of claim 1, wherein data retrieved by the first query from the first database includes geolocation data, wherein the first database is a non-relational database storing the geolocation data as key-value pairs, and wherein a given entry in the non-relational database includes a key storing an entity identifier corresponding to an entity and a value storing a latitude and longitude indicating a geographic location of the entity.

6. The method of claim 5, wherein executing the first service for the first query to retrieve geolocation data from the first database includes performing a k-nearest neighbor (kNN) search query on the first database, wherein a search region of the kNN search query is a circle with a minimum radius that encompasses a number of entities that satisfies an entity threshold requirement, and wherein the number of entities are located in geographic locations that fall within a circumference of the circle.

7. The method of claim 1, wherein the plurality of requests are received via a single user interface of the bifurcated computer system, and wherein the single user interface includes a user interface element capable of receiving user input specifying the first type of data or the second, different type of data.

8. The method of claim 1, wherein the first database and the second database are implemented using the same database schema.

9. A non-transitory computer-readable medium having instructions stored thereon that are executable by a computing system to perform operations comprising:
receiving, from one or more user devices, a plurality of requests to execute queries;
executing, for a first query specified by one of the plurality of requests, a first service included in a first pipeline of the computing system, wherein executing the first service is performed based on the first query specifying a first type of data to access, wherein executing the first service includes accessing, for the first query, a first database, wherein the first database is included in the first pipeline of the system and stores the first type of data, and wherein the first type of data is real-time data;
executing, for a second query specified by one of the plurality of requests, a second service included in a second, separate pipeline of the system, wherein executing the second service is performed based on the second query specifying a second, different type of data to access, wherein executing the second service includes accessing, for the second query, a second database, wherein the second database is included in the second pipeline of the system and stores the second, different type of data, and wherein the second, different type of data is batch data;

transmitting, to a user device corresponding to the first query, results of accessing the first database; and transmitting, to a user device corresponding to the second query, results of accessing the second database.

10. The non-transitory computer-readable medium of claim 9, wherein the data retrieved by the first query from the first database includes transaction network graph data, wherein the first database is a non-relational database storing the transaction network graph data as key-value pairs, and wherein a given entry in the non-relational database includes a key storing an entity identifier corresponding to an entity and a value storing transaction data indicating information for a given transaction executed for the entity, including a transaction identifier.

11. The non-transitory computer-readable medium of claim 9, wherein the first type of query processes data in real-time and the second type of query performs batch processing.

12. The non-transitory computer-readable medium of claim 9, wherein the first service is an online transaction processing (OLTP) service and the second service is an online analytical processing (OLAP) service, and wherein the first query is an OLTP query and the second query is an OLAP query.

13. The non-transitory computer-readable medium of claim 9, wherein the data retrieved by the first query from the first database includes geolocation data, wherein the first database is a non-relational database storing the geolocation data as key-value pairs, and wherein a given entry in the non-relational database includes a key storing an entity identifier corresponding to an entity and a value storing a latitude and longitude indicating a geographic location of the entity.

14. The non-transitory computer-readable medium of claim 13, wherein executing the first service for the first query to retrieve geolocation data from the first database includes performing a k-nearest neighbor (kNN) search query on the first database, wherein a search region of the kNN search query is a circle with a minimum radius that encompasses a number of entities that satisfies an entity threshold requirement, and wherein the number of entities are located in geographic locations that fall within a circumference of the circle.

15. The non-transitory computer-readable medium of claim 9, wherein the plurality of requests are received via a single user interface of the computing system, and wherein the single user interface includes a user interface element capable of receiving user input specifying the first type of data or the second, different type of data.

16. A bifurcated system, comprising:

an online data processing service;

an offline data processing service;

a non-transitory computer-readable medium having stored thereon instructions that are executable by the online data processing service and the offline data processing service to cause the system to perform operations comprising:

receiving, from one or more user devices, a plurality of requests to execute queries;

executing, for a first query specified by one of the plurality of requests, the online data processing service included in a first portion of the bifurcated system, wherein executing the online data processing service is performed based on the first query specifying a first type of geolocation data to access, and wherein the first type of geolocation data is real-time data;

accessing, via the online data processing service and for the first query, a first database, wherein the first database is included in the first portion of the bifurcated system and stores the first type of geolocation data;

executing, for a second query specified by one of the plurality of requests, the offline data processing service of the bifurcated system, wherein executing the offline data processing service is performed based on the second query specifying a second, different type of geolocation data to access, and wherein the second, different type of geolocation data is batch data;

accessing, via the offline data processing service and for the second query, a second database, wherein the second database is included in a second, separate portion of the bifurcated system and stores the second type of geolocation data; and transmitting results of accessing the first database to a user device corresponding to the first query and results of accessing the second database to a user device corresponding to the second query, wherein transmitting the results of accessing the first database is performed prior to transmitting the results of accessing the second database.

17. The system of claim 16, real-time data is OLTP data and the batch data is OLAP data.

18. The system of claim 16, wherein an amount of data returned in the results of accessing the second database is larger than an amount of data returned in the results of accessing the first database.

19. The system of claim 16, wherein executing the online data processing service for the first query to retrieve geolocation data from the first database includes performing a k-nearest neighbor (kNN) search query on the first database, wherein a search region of the kNN search query is a circle with a minimum radius that encompasses a number of entities that satisfies an entity threshold requirement, and wherein the number of entities are located in geographic locations that fall within a circumference of the circle.

20. The system of claim 16, wherein the second query specified by one of the plurality of requests includes receiving a tabular formatted file specifying a plurality of sets of search parameters, and wherein a given set of search parameters specifies coordinates for a geographic location and a minimum radius surrounding the geographic location.

* * * * *